United States Patent [19]
Baba et al.

[11] Patent Number: 5,392,459
[45] Date of Patent: Feb. 21, 1995

[54] POWER CONTROL IN MICROWAVE TRANSMISSION SYSTEM INCREASING POWER OF BOTH HORIZONTALLY AND VERTICALLY POLARIZED WAVES

[75] Inventors: Satoshi Baba; Yoshio Ito, both of Tokyo, Japan

[73] Assignee: NEC Corporation, Tokyo, Japan

[21] Appl. No.: 981,306

[22] Filed: Nov. 25, 1992

[30] Foreign Application Priority Data

Nov. 27, 1991 [JP] Japan ................. 3-335972

[51] Int. Cl.6 ............... H04B 17/02; H04B 7/005; H04B 15/04; H04B 1/12
[52] U.S. Cl. ................. 455/69; 455/63; 455/67.1; 342/361
[58] Field of Search ............ 455/52.3, 52.1, 67.1, 455/101, 63, 69, 132, 272, 278.1; 343/756; 342/361

[56] References Cited

U.S. PATENT DOCUMENTS 4,004,224 1/1977 Arens et al. ............... 455/52.1

FOREIGN PATENT DOCUMENTS 0322525 7/1989 European Pat. Off.

Primary Examiner—Edward F. Urban
Assistant Examiner—Mark D. Wisler
Attorney, Agent, or Firm—Sughrue, Mion, Zinn, Macpeak & Seas

[57] ABSTRACT

An automatic transmit power control (ATPC) method and system for radio equipment of a cross polarization interference canceler system (XPIC system) wherein two orthogonally polarized waves of the same frequency channel are used independently of each other. The transmit powers of the polarized waves of the object frequency channel are simultaneously increased when a drop of the receive signal level of at least one of the two polarized waves of the object frequency channel is detected.

14 Claims, 4 Drawing Sheets

POWER CONTROL IN MICROWAVE TRANSMISSION SYSTEM INCREASING POWER OF BOTH HORIZONTALLY AND VERTICALLY POLARIZED WAVES

BACKGROUND OF THE INVENTION

1. Field of the Invention

This invention relates to an automatic transmit power control method and system for radio equipment, and more particularly to an automatic transmit power control method and system for radio equipment of a cross polarization interference canceler system (XPIC system).

2. Description of the Related Art

It is common practice in radio communications to set different signal channels for two orthogonally polarized waves of the same frequency channel in order to make effective use of the frequency resources. The two orthogonally polarized waves may be, for example, a vertically polarized wave and a horizontally polarized wave. In the following description, the vertically polarized wave and the horizontally polarized wave are referred to as V-polarized wave and H-polarized wave, respectively. The XPIC system is one radio communications system wherein the two orthogonally polarized waves are used commonly in communications from the transmission side to the reception side while canceling the interference between the polarized waves to enhance the independence of the individual signal channels. An XPIC system is employed, for example, in a microwave digital communications network.

In microwave communications, a single transmission band is divided into a plurality of frequency channels, and a transmitter and a receiver are provided for each of the frequency channels. When the XPIC system is applied to microwave communications, a transmitter and a receiver are provided for each V-polarized wave and each H-polarized wave of each of the frequency channels.

In microwave communications, only one particular frequency channel sometimes suffers from a high transmission loss due to multipath fading or from some other cause. When there is the influence of deep fading, not only the S/N ratio of the particular frequency channel is deteriorated, but also interference from an adjacent frequency channel or channels is increased, resulting in deterioration in the quality of received signals. Therefore, an ATPC (Automatic Transmit Power Control) system has been developed which increases the transmit power only for a particular frequency channel which undergoes deep fading. The ATPC system is generally so constructed that, when a drop of the receive signal level or reception intensity on the reception side is detected, the information is transmitted to the transmission side by way of a control circuit or control line in the opposite direction, and on the transmission side, the transmitter is controlled so as to increase the transmit power. Naturally, when the influence of multipath fading disappears, the original transmit power is restored.

Here, an application of an ATPC system to an XPIC system is investigated. Since control is effected for each pair of transmitters and receivers in a conventional ATPC system, ATPC control is effected for the V-polarized wave and the H-polarized wave of the same frequency channel independently of each other. FIG. 1 shows an exemplary conventional ATPC system applied to an XPIC system. Only the construction of a conventional ATPC system for a frequency channel whose center frequency is $f_1$ is shown in FIG. 1.

Referring to FIG. 1, the transmission site includes transmitter 51a for a V-polarized wave, circulator 52a provided on the output side of transmitter 51a, automatic transmit power controller 53a for controlling the output power of a V-polarized wave transmitter 51a, transmitter 51b for a H-polarized wave, circulator 52b provided on the output side of transmitter 51b, automatic transmit power controller 53b for controlling the output power of transmitter 51b, and antenna 54 provided commonly for the V-polarized wave and the H-polarized wave. Each of circulators 52a and 52b is connected to an individual receiver (not shown) which is provided for transmission in the opposite direction. Antenna 54 is so constructed that it can radiate a V-polarized wave and a H-polarized wave simultaneously without mixing them.

Meanwhile, the reception site includes receiver 57a for a V-polarized wave, circulator 56a provided on the input side of receiver 57a, controller 58a for controlling automatic transmit power controller 53a of the transmission site in response to the reception intensity of the V-polarized wave, receiver 57b for a H-polarized wave, circulator 56b provided on the input side of receiver 57b, controller 58b for controlling automatic transmit power controller 53b of the transmission site in response to the reception intensity of the H-polarized wave, and antenna 55 provided commonly for the V-polarized wave and the H-polarized wave. Antenna 55 is capable of receiving a V-polarized wave and a H-polarized wave simultaneously and separating them from each other. V-polarized wave components of the received wave are supplied to circulator 56a while H-polarized wave components of the received wave are supplied to circulator 56b. Each of circulators 56a and 56b is connected to an individual transmitter (not shown) which is provided for transmission in the opposite direction. Receivers 57a and 57b have an identical construction and each includes first level detector 61 for detecting the reception intensity of a frequency channel whose center frequency is $f_1$, and second level detector 62 for detecting the reception intensity of an adjacent frequency channel. Second level detector 62 includes band eliminating filter 63 and detection element 64. An input signal to receiver 57a or 57b is supplied to first and second level detectors 61 and 62.

Controller 58a and automatic transmit power controller 53a for the V-polarized wave are interconnected by way of control line 59a which extends from the reception site to the transmission site. Controller 58a sends out an automatic transmit power control signal to automatic transmit power controller 53a in response to the outputs of first and second level detectors 61 and 62 of receiver 57a. The automatic transmit power control signal is used to increase the transmit power of transmitter 51a for a V-polarized wave when the reception sensitivity for the object frequency channel (whose center frequency is $f_1$) drops to a level lower than a certain threshold level or when the difference between the level of the object frequency channel and the level of an adjacent frequency channel exceeds another certain threshold level. Similarly, controller 58b and automatic transmit power controller 53b for the H-polarized wave are interconnected by way of control line 59b, which transmits an automatic transmit power control signal for a H-polarized wave therethrough.

Automatic control of the transmit power in the ATPC system is next described with reference to FIG. 2(a), FIG. 2(b), and FIG. 2(c) The frequency configuration as shown in the waveform curve of FIG. 2(a) is assumed first. In particular, two adjacent frequency channels (whose center frequencies are $f_0$ and $f_2$) are present for an object frequency channel (whose center frequency is $f_1$). Two orthogonal polarized waves are used independently of each other at least for the object frequency channel. Here, it is assumed that the reception sensitivity for the object frequency channel is dropped by multipath fading until the level difference of the V-polarized wave of the object frequency channel from that of an adjacent frequency channel exceeds a predetermined threshold level as shown by the waveform curve in FIG. 2(b). Then, an automatic transmit power control signal to increase the transmit power is transmitted from controller 58a to automatic transmit power controller 53a. Consequently, the reception sensitivity for the V-polarized wave side of the object frequency channel is raised as seen from the waveform curve of FIG. 2(c). Since the transmit power on the H-polarized wave side, however, remains without change, then an increase of the transmit power on the V-polarized wave side will result in an increase in interference from the V-polarized wave side to the H-polarized wave side, and will consequently result in deterioration of the signal of the H-polarized wave of the object frequency channel.

SUMMARY OF THE INVENTION

It is an object of the present invention to provide an automatic transmit power control method by which automatic transmit power control can be effected in accordance with reception sensitivity and interference between orthogonally polarized waves can be prevented.

It is another object of the present invention to provide an automatic transmit power control system by which automatic transmit power control can be effected in accordance with reception sensitivity and interference between orthogonally polarized waves can be prevented.

The former object of the present invention is achieved by an automatic transmit power control method for a communications system wherein a transmission band is divided into a plurality of successive frequency channels and radio communications are effected from a transmission end to a reception end by using two orthogonally polarized waves of the same frequency channel independently of each other, comprising the steps of: detecting, at the reception end, receive signal levels of the two polarized waves of an object frequency channel for control; and simultaneously raising, at the transmitting end, when a drop of the receive signal level of at least one of the two polarized waves is detected, the transmit powers of the two polarized waves of the object frequency channel.

The latter object of the present invention is achieved by an automatic transmit power control system for a communications system wherein a transmission band is divided into a plurality of successive frequency channels and radio communications are effected from a transmission end to a reception end by using two orthogonally polarized waves of the same frequency channel independently of each other, comprising: a pair of first level detection means provided individually for the two polarized waves of an object frequency channel for control at the reception end for individually detecting the receive signal levels of the two polarized waves; first control means provided at the receiving end for receiving results of detection from the first level detection means and generating a control signal when a drop of the receive signal level of at least one of the two polarized waves is detected; second control means provided at the transmitting end for simultaneously raising, when the control signal is received, transmit powers for the two polarizes waves of the frequency channel of the object for control; and control line means for interconnecting the first and second control means.

The above and other objects, features and advantages of the present invention will become apparent from the following description referring to the accompanying drawings which illustrate an example of a preferred embodiment of the present invention.

DETAILED DESCRIPTION OF THE PREFERRED EMBODIMENT

Figure 1:
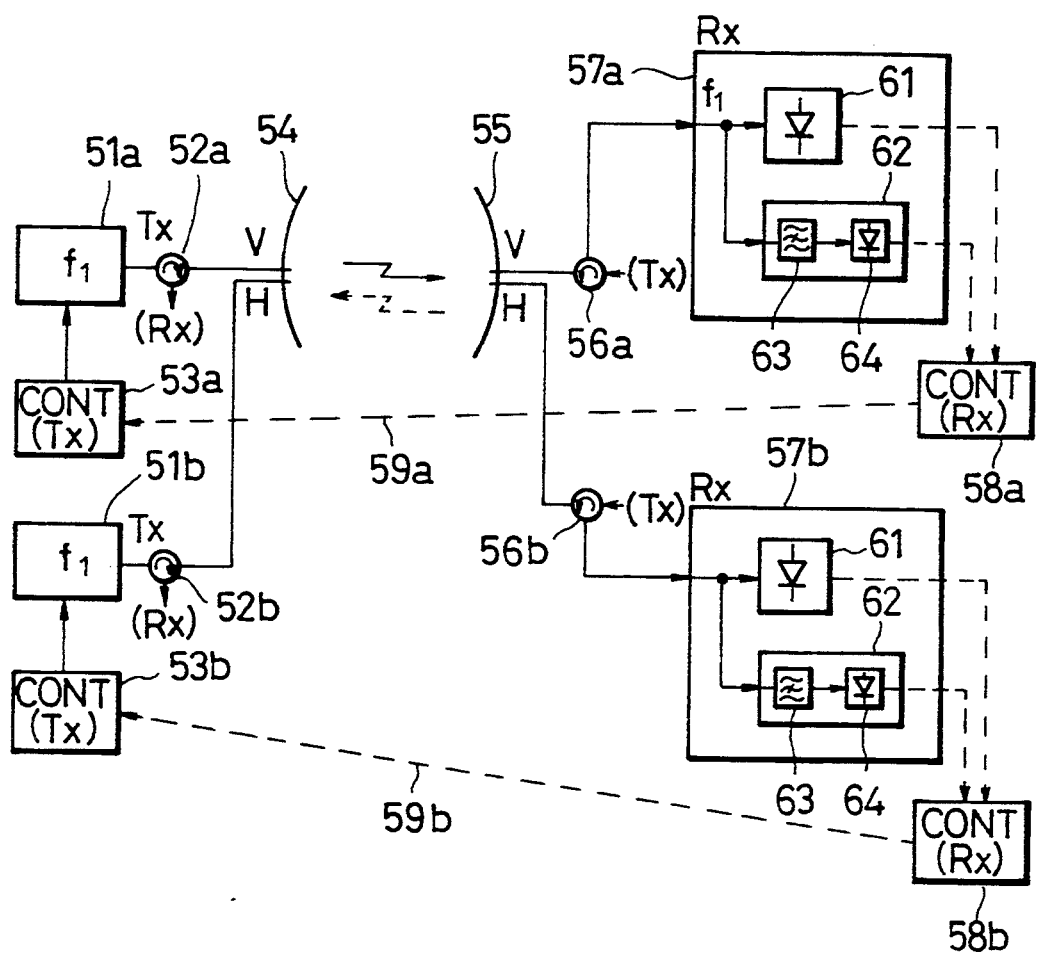
FIG. 1 is a block diagram showing the construction of a conventional ATPC system in an XPIC system.
Figure 2A:
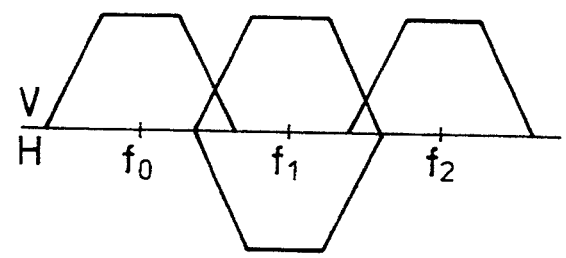
FIG. 2(a) FIG. 2(b), and FIG. 2(c) are diagrams illustrating operation of the ATPC system shown in FIG. 1.
Figure 2B:
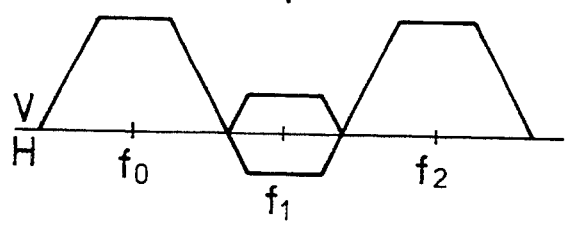
Figure 2C:
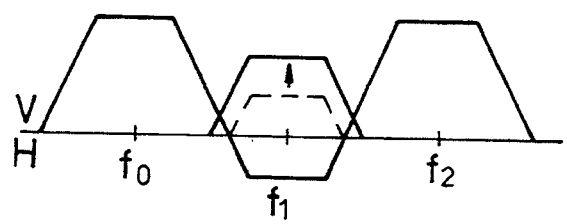
Figure 3:
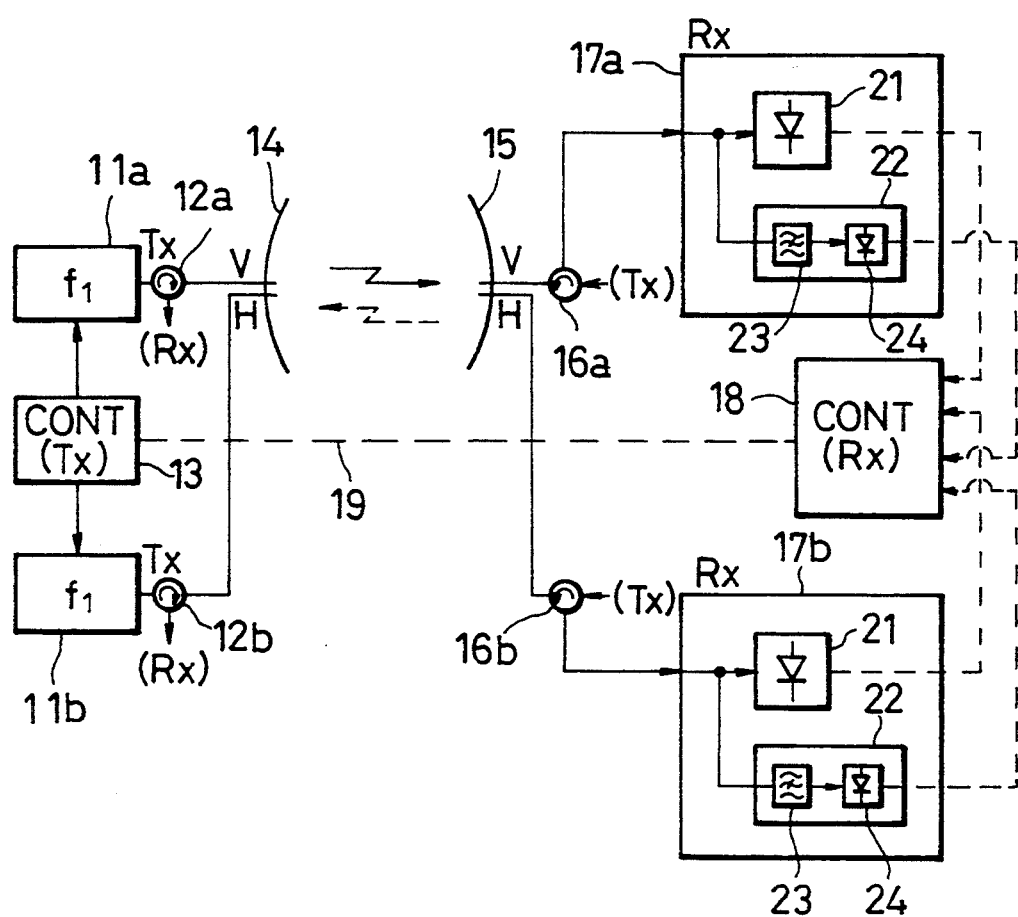
FIG. 3 is a block diagram showing the construction of the ATPC system of a preferred embodiment of the present invention.

Referring first to FIG. 3, there is shown an ATPC system according to a preferred embodiment of the present invention. The ATPC system shown is used for a microwave circuit of an XPIC system which interconnects two ground stations. In FIG. 3, only the construction for one of a plurality of successive frequency channels constituting the microwave circuit is shown. The center frequency of the frequency channel is $f_1$, and this frequency channel is hereinafter referred to as the object frequency channel. Further, the present ATPC system employs, as two orthogonally polarized waves, a vertically-polarized wave (V-polarized wave) and a horizontally-polarized wave (H-polarized wave) with respect to the ground.

The transmission site includes transmitter 11a for a V-polarized wave, circulator 12a provided on the output side of transmitter 11a for a V-polarized wave, transmitter 11b for a H-polarized wave, circulator 12b provided on the output side of transmitter 11b, automatic transmit power controller 13 for controlling the output power of transmitters 11a and 11b, and antenna 14 provided commonly for the V-polarized wave and the H-polarized wave. Each of transmitters 11a and 11b generates a microwave signal of the object frequency channel, and a modulator for modulating an input signal, and certain other circuit or circuits are connected thereto when necessary. Antenna 14 is connected to circulators 12a and 12b and can radiate the V-polarized wave and the H-polarized wave from circulators 12a and 12b simultaneously therefrom without mixing either wave with each other while keeping the relationship between both polarized waves. Each of circulators 12a and 12b is connected to an individual receiver (not shown) which is for transmission in the opposite direction. As antenna 14, an antenna which is normally used in the microwave range of frequency, such as, for example, a parabola antenna, a horn antenna or a horn reflector antenna, is employed.

While only the construction for the object frequency channel is shown in FIG. 3, transmitters 11a and 11b, circulators 12a and 12b and automatic transmit power controller 13 are each prepared in a number equal to the number of frequency channels the system occupies, and this would be recognized readily by those skilled in the art. Also the construction for mixing transmission signals of different frequency channels with each other and radiating the mixed transmission signals from common antenna 14 should be obvious to those skilled in the art.

Separately, the reception site includes receiver 17a for a V-polarized wave, circulator 16a provided on the input side of receiver 17a for the V-polarized wave, receiver 17b for a H-polarized wave, circulator 16b provided on the input side of receiver 17b, controller 18 for controlling automatic transmit power controller 13, and antenna 15 provided commonly for the V-polarized wave and the H-polarized wave. Antenna 15 is opposed to antenna 14 of the transmission site and has the capability of receiving V-polarized wave components and H-polarized-wave components simultaneously without mixing either wave with each other. Antenna 15 receives a microwave signal from the transmission site and supplies V-polarized wave components of the received microwave signal to circulator 16a while it supplies H-polarized wave components of the received microwave signal to other circulator 16b. Each of circulators 16a and 16b is connected to an individual transmitter (not shown) which is for transmission in the opposite direction. As antenna 15, an antenna which is normally used in the microwave range, such as, for example, a parabola antenna, a horn antenna or a horn reflector antenna, is employed. Antenna 14 of the transmission site and antenna 15 of the reception site may be of the same type or different from each other.

Receivers 17a and 17b have an identical construction and each includes first level detector 21 for detecting the reception intensity of a microwave of the object frequency channel and second level detector 22 for detecting the reception intensity of another frequency channel adjacent to the object frequency channel. First level detector 21 may also serve as a detector for detecting a receive signal and outputting the detected receive signal. Second level detector 22 includes band eliminating filter 23 for receiving a receive signal and detection element 24 provided on the output side of band eliminating filter 23. Here, band eliminating filter 23 stops a signal of the object frequency channel but passes a signal of another frequency channel or channels adjacent to the object frequency channel therethrough. The outputs of first and second level detectors 21 and 22 of transmitters 17a and 17b are inputted to controller 18.

Controller 18 is connected to automatic transmit power controller 13 of the transmission site by way of control line 19. Control line 19 is provided to transmit various control signals between the reception site and the transmission site therethrough and may be constructed by making use of part of a band of the microwave circuit or of a conductor. Although obvious to those skilled in the art, a control line of the type mentioned is necessarily provided in an ordinary microwave communication network.

It is to be noted that, while only the construction for the object frequency channel is shown in FIG. 3, receivers 17a and 17b, circulators 16a and 16b and controller 18 are actually each provided in a number equal to the number of frequency channels the system occupies, and this will be readily recognized by those skilled in the art. Also the construction of branching signals of different frequency channels received by common antenna 15 and supplying them to the corresponding receivers is obvious to those skilled in the art.

Next, automatic transmit power controller 13 and controller 18 are described in detail. Controller 18 calculates, in accordance with output values of first and second level detectors 21 and 22, the receive signal level of the object frequency channel and the receive signal level of another frequency channel adjacent to the object frequency channel for each of a V-polarized wave and a H-polarized wave. Then, when at least one of following conditions (a) and (b) is satisfied, controller 18 generates an automatic transmit power control signal to increase the transmit power and transmits the automatic transmit power control signal to automatic transmit power controller 13 by way of control line 19:

(a) when the receive signal level of at least one of the two polarized waves of the object frequency channel drops below a first threshold level; and (b) when the receive signal level of at least one of the two polarized waves of the object frequency channel is lower than the receive signal level of an adjacent frequency channel and the difference between the two receive signal levels is higher than a second threshold level.

When neither conditions (a) nor (b) is satisfied, controller 18 generates an automatic transmit power control signal for transmission with the ordinary transmit power and transmits it to automatic transmit power controller 13. It is to be noted that the receive signal level of an adjacent frequency channel may be either the receive signal level of one of two commonly available adjacent frequency channels or the average value of the receive signal levels of two adjacent frequency channels. A better result was obtained when the receive level of an adjacent frequency channel was represented by the average value.

Automatic transmit power controller 13 controls, when an automatic transmit power control signal to increase the transmit power is received, transmitters 11a and 11b to raise the transmit powers thereof from an ordinary value, but when another automatic transmit power control signal for transmission with the ordinary transmit power is received, automatic transmit power controller 13 controls transmitters 11a and 11b to operate with the ordinary transmit power.

Figure 4A:
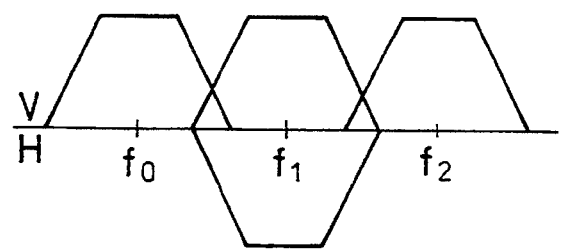
FIG. 4 is a diagram illustrating operation of the ATPC system shown in FIG. 3.
Figure 4B:
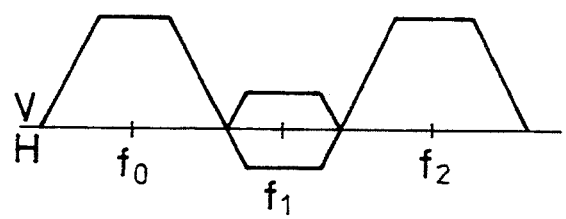
Figure 4C:
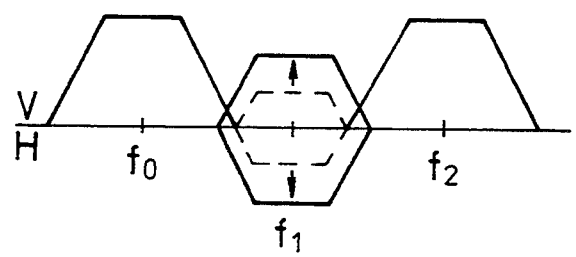

Automatic control of the transmit power in the ATPC system is next described with reference to FIG. 4. The frequency configuration shown by waveform curve (a) in FIG. 4 is assumed first. In particular, two adjacent frequency channels (whose center frequencies are $f_0$ and $f_2$) are present for an object frequency channel (whose center frequency is $f_1$). Two orthogonally polarized waves are used independently of each other at least for the object frequency channel. Of course, two orthogonally polarized waves may be used independently of each other for each of the frequency channels whose center frequency are $f_0$ and $f_2$. Here, it is assumed that the reception sensitivity for the object frequency channel is dropped by multipath fading until the level difference of the V-polarized wave of the object frequency channel from that of the adjacent frequency channel exceeds the second threshold level as shown by waveform curve (b) in FIG. 4. Then, an automatic transmit power control signal to increase the transmit power is transmitted from controller 18 to automatic transmit power controller 13. As a result, the transmit powers for both the V- and H-polarized waves of the object frequency channel are raised simultaneously so that the reception sensitivities for both polarized waves are raised, as seen from waveform curve (c) of FIG. 4. Accordingly, even if multipath fading or some other phenomenon occurs, the interference from any of the adjacent frequency channels (whose center frequencies are $f_0$ and $f_2$) with the signal of the V-polarized wave is minimized. Further, since the level of a signal which leaks from the V-polarized wave to the H-polarized wave is equal to the level of another signal which leaks from the H-polarized wave to the V-polarized wave, interference of a signal between the two polarized waves is prevented. In other words, deterioration of a signal by interference between orthogonally polarized waves in one-way transmission can be prevented.

While the operation of the automatic transmit power control system when a drop of a reception signal on the V-polarized wave side is detected is described above, the deterioration of a signal by interference between orthogonally polarized waves can of course be prevented by similar operation also when a drop of the level of a reception signal on the H-polarized wave side is detected.

It is to be understood that variations and modifications of the automatic transmit power control method and system disclosed herein will be evident to those skilled in the art. It is intended that all such modifications and variations be included within the scope of the appended claims.

What is claimed is:

1. An automatic transmit power control method for a communications system wherein a transmission band is divided into a plurality of successive frequency channels and radio communications are effected from a transmission end to a reception end by using two orthogonally polarized waves of the same frequency channel independently of each other, comprising the steps of:
   detecting, at said reception end, receive signal levels of the two polarized waves of an object frequency channel for control; and
   simultaneously raising at said transmitting end, when a drop of the receive signal level of either of the two polarized waves is detected, the transmit powers of the two polarized waves of the object frequency channel.

2. An automatic transmit power control method as claimed in claim 1, wherein the radio communications are effected by means of microwaves.

3. An automatic transmit power control method as claimed in claim 2, wherein the two orthogonally polarized waves include a wave vertically polarized with respect to the ground and another wave horizontally polarized with respect to the ground.

4. An automatic transmit power control method as claimed in claim 2, wherein the detection of a drop of the receive signal level is effected based on a difference of the receive signal level of the object frequency channel from the receive signal level of an adjacent frequency channel to the object frequency channel.

5. An automatic transmit power control method as claimed in claim 4, wherein the detection of a drop of the receive signal level is performed when the receive signal level of the object frequency channel is lower than a first threshold level and when the receive signal level of the object frequency channel is lower than the receive signal level of the adjacent frequency channel and the difference between the two receive signal levels is higher than a second threshold level.

6. An automatic transmit power control method as claimed in claim 4, wherein the receive signal level of the adjacent frequency channel is represented by an average value of receive signal levels of both adjacent frequency channels to the frequency channel of the object for control.

7. An automatic transmit power control method as claimed in claim 1, wherein detecting the receive signal levels of the two polarized waves includes canceling interference between the two polarized waves with a cross-polarization interference canceller.

8. An automatic transmit power control system for a communications system wherein a transmission band is divided into a plurality of successive frequency channels and radio communications are effected from a transmission end to a reception end by using two orthogonally polarized waves of the same frequency channel independently of each other, comprising:
   a pair of first level detection means provided individually for the two polarized waves of an object frequency channel for control at said reception end for individually detecting receive signal levels of the two polarized waves;
   first control means provided at said receiving end for receiving results of detection from said first level detection means and generating a control signal when a drop of the receive signal level of either of the two polarized waves is detected;
   second control means provided at said transmitting end for simultaneously raising, when the control signal is received, transmit powers for the two polarized waves of the frequency channel of the object for control; and
   control line means for interconnecting said first and second control means.

9. An automatic transmit power control system as claimed in claim 8, wherein the radio communications are effected by means of microwaves.

10. An automatic transmit power control system as claimed in claim 9, wherein the two orthogonally polarized waves include a wave vertically polarized with respect to the ground and another wave horizontally polarized with respect to the ground.

11. An automatic transmit power control system as claimed in claim 9, further comprising second level detection means for detecting a receive signal level of a frequency channel adjacent to the object frequency channel and outputting the detected receive signal level to said first control means, and wherein said first control means generates the control signal in accordance with a difference between results of detection of said first and second level detection means.

12. An automatic transmit power control system as claimed in claim 11, wherein said first control means generates the control signal when the receive signal level of the object frequency channel is lower than a first threshold level and when the receive signal level of the object frequency channel is lower than the receive signal level of the adjacent frequency channel and the difference between the two receive signal levels is higher than a second threshold level.

13. An automatic transmit power control system as claimed in claim 11, wherein said second level detection means outputs a result of detection thereof based on an average value of receive signal levels of two adjacent frequency channels to the frequency channel of the object for control.

14. An automatic transmit power control system as claimed in claim 8, further comprising a cross-polarization interference canceller provided at said receiving end for canceling interference between the two polarized waves.

* * * * *